United States Patent [19]
Feinberg et al.

[11] 4,024,622
[45] May 24, 1977

[54] METHOD OF MAKING ROLLER UNITS

[75] Inventors: Irving Feinberg, Saddle Brook; Carl Friedrich, Union, both of N.J.

[73] Assignee: Presto Lock Company, Division of Walter Kidde & Company, Inc., Elmwood Park, N.J.

[22] Filed: July 22, 1976

[21] Appl. No.: 707,677

Related U.S. Application Data

[62] Division of Ser. No. 597,755, July 21, 1975.

[52] U.S. Cl. .................................. 29/417; 29/33.5; 29/526; 29/DIG. 3; 29/DIG. 37; 113/116 Y; 113/116 V
[51] Int. Cl.² .................. B21D 51/16; B23P 17/02
[58] Field of Search ......... 29/417, 412, 33 Q, 33 S, 29/DIG. 3, DIG. 37, DIG. 40, 526; 113/116 Y, 116 V, 116 BB, 116 HA; 72/379, 324

[56] References Cited

UNITED STATES PATENTS

| 1,018,817 | 2/1912 | Farrell | 29/DIG. 3 |
| 2,524,236 | 10/1950 | Schultz, Jr. | 16/31 |
| 2,643,446 | 6/1953 | Matthysse et al. | 29/417 X |
| 3,691,601 | 9/1972 | Hough | 29/417 X |

FOREIGN PATENTS OR APPLICATIONS

| 916,755 | 1/1963 | United Kingdom | 29/417 |

*Primary Examiner*—Victor A. DiPalma
*Attorney, Agent, or Firm*—Shapiro and Shapiro

[57] ABSTRACT

A roller unit for use as a caster for luggage, for example, has a sturdy one-piece roller housing formed of sheet metal, the housing comprising a rectangular base with raised pads at opposite ends thereof and a roller-receiving shell defined by a pair of opposed U-shaped walls bent from opposite longitudinal edge regions of the base between the pads. Roller units are manufactured seriatim by metal forming operations that do not require deep-drawing.

15 Claims, 8 Drawing Figures

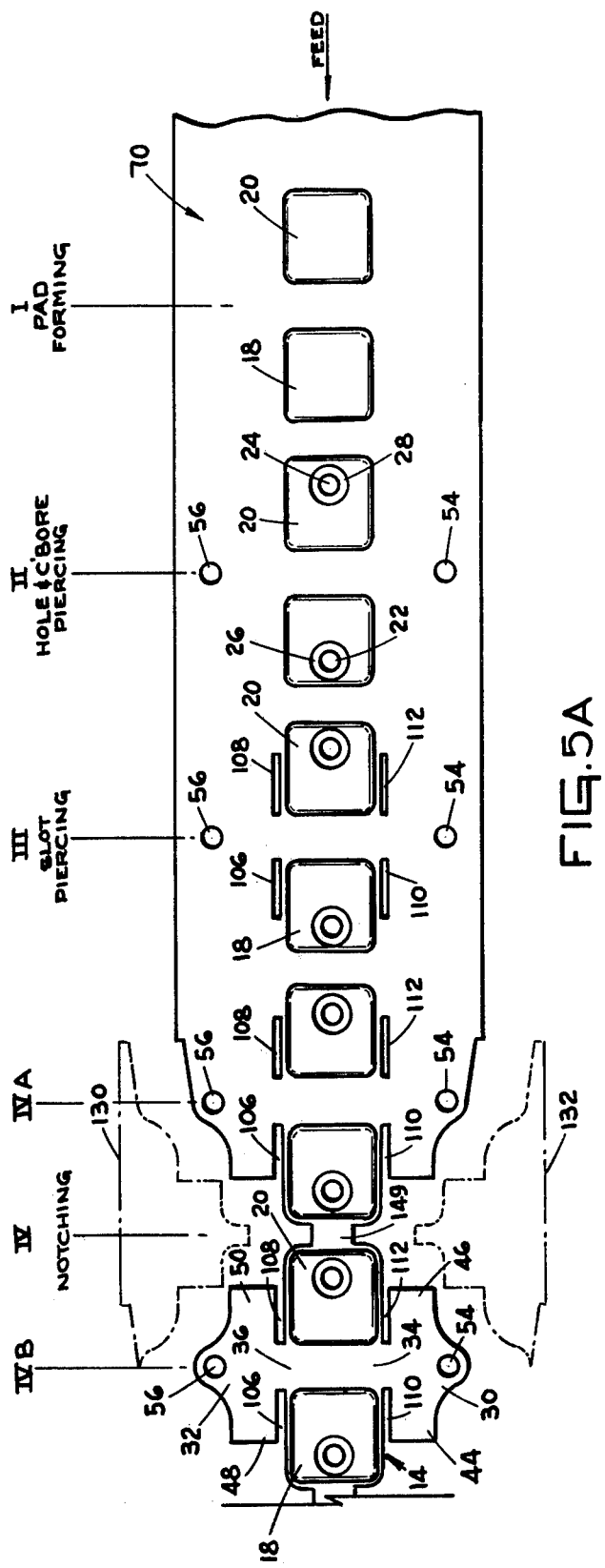
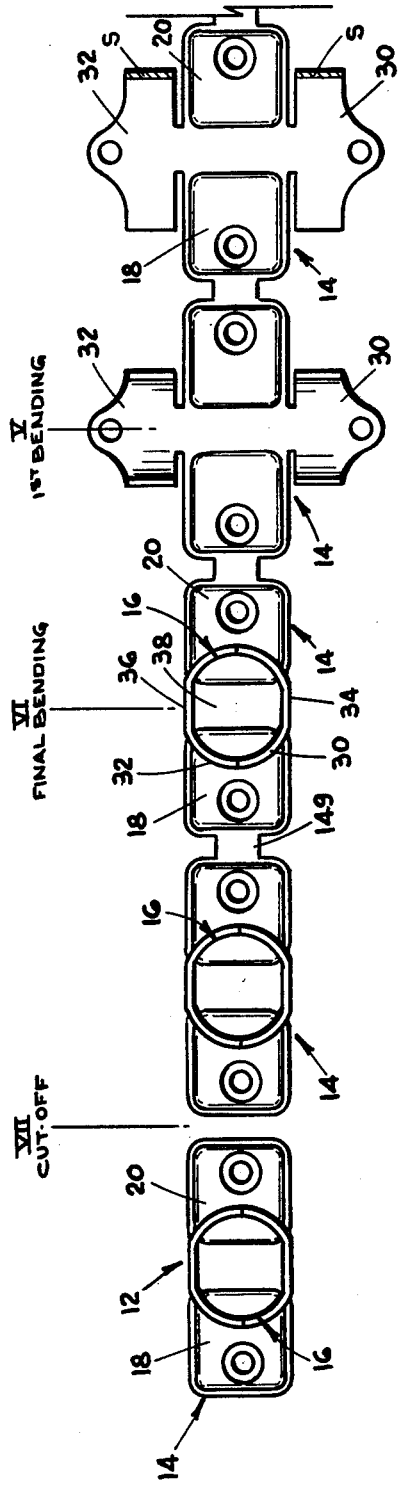
FIG.5A
FIG.5B

METHOD OF MAKING ROLLER UNITS

This is a division of application Ser. No. 597,755 filed July 21, 1975.

BACKGROUND OF THE INVENTION

This invention is concerned with roller units, particularly roller units that may be employed as casters for luggage.

One type of roller unit employed heretofore as a caster for luggage comprises a one-piece metal housing having a roller-receiving shell formed by a series of metal working operations which draw the shell from a metal strip and bring it to size gradually. At the end of the draw a final trim-out provides the proper shell opening, and then an additional piercing or drilling operation produces holes in the shell for a shaft on which the roller rotates. This type of roller unit has certain disadvantages, including the following: the base of the unit has a hole where the shell is drawn from the base; the metal of the formed shell is tinned out due to the drawing operation; secondary operations are required for trimming out and hole-piercing or drilling. Other types of roller units have other disadvantages, such as housings with multiple parts that must be assembled, or housings that have insufficient strength.

BRIEF DESCRIPTION OF THE INVENTION

It is accordingly an object of the present invention to provide improved roller units and improved methods of manufacturing the same.

More specifically, it is an object of the invention to provide roller units in which a one-piece sheet metal housing comprises a base and a shell, and in which the shell is manufactured without forming an opening in the base and without thinning out the metal, as would occur in metal forming by deep drawing.

Briefly stated, a roller unit in accordance with the invention comprises a housing of sheet metal having a base and a roller-receiving shell, the shell including wall means bent from an edge of the base and extending substantially transversely to the base. In the manufacture of the roller unit, a base and a pair of wings are formed from sheet metal, the wings being integral with the base and extending outwardly of the base from opposite edges thereof. The wings are formed into a shell substantially perpendicular to the base by bending the wings relative to the base at said edges and by making each wing substantially U-shaped, with arms extending toward corresponding arms of the other wing and overlapping the base.

BRIEF DESCRIPTION OF THE DRAWINGS

The invention will be further described in conjunction with the accompanying drawings, which illustrate preferred and exemplary embodiments, and wherein:

FIG. 5A and 5B are plan views which together illustrate successive steps in the manufacture of roller units in accordance with the invention;

DETAILED DESCRIPTION OF THE INVENTION

Figure 1:
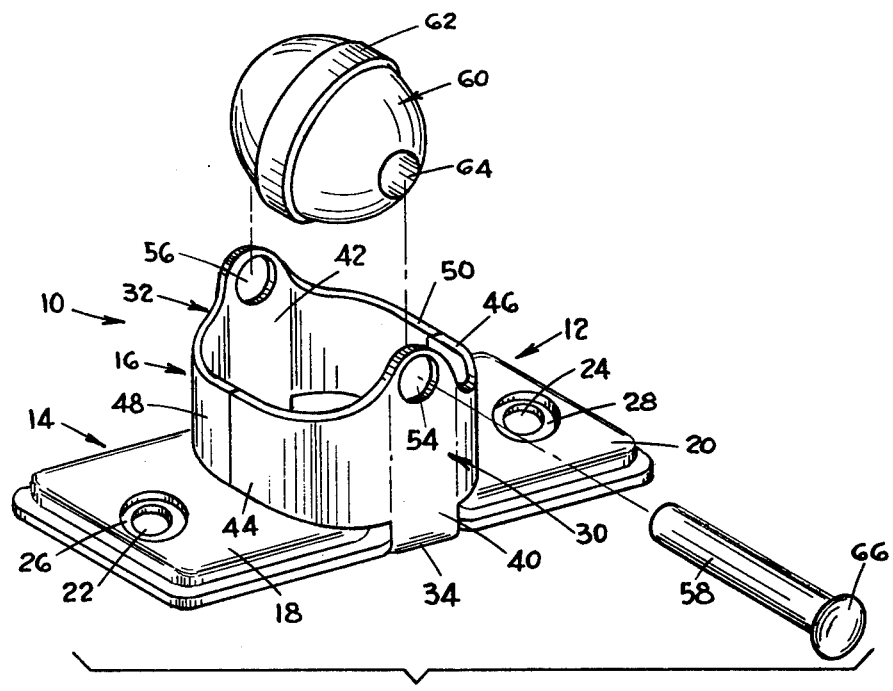
FIG. 1 is an exploded perspective view of a roller unit in accordance with the invention, the unit being shown inverted from its usual operative position.

Referring to the drawings, and initially to FIGS. 1–4 thereof, a roller unit 10 of the invention comprises a one-piece metal housing 12 having an elongated base 14 and a shell 16 integral therewith. In the form shown the base 14 is generally rectangular and has a pair of rectangular up-raised pads 18 and 20 at opposite ends thereof. Each pad is provided with a bore 22 and 24 countersunk at 25 or 28 in a direction opposite to the up-raising of the pads 18 and 20. The bores 22 and 24 receive fasteners (not shown) such as rivets or the like for attaching the base 14 to an object such as a piece of luggage. The roller units will usually be employed in pairs. One pair of roller units constructed in accordance with the invention may support one end of a suitcase, for example, while swivel roller units of conventional type may support the other end.

The shell 16 comprises a pair of walls 30 and 32 which are bent from opposite longitudinal side edge regions 34 and 36 of the base 14. In the preferred form illustrated the central region 38 of the base is substantially flat (see FIG. 4) rather than up-raised like the pads 18 and 20, and the central stems 40 and 42 of the walls 30 and 32 are extensions of the central region 38 of the base separating the pads 18 and 20. The pad perimeters are defined by edge regions of the base and by the central region 38.

Each wall 30 or 32 is substantially U-shaped in cross section in a plane parallel to the base 14 and has a pair of arms 44, 46 or 48, 50 projecting oppositely from the central stem 40 or 42, with the arms of one wall extending toward and mating with corresponding arms of the other wall and overlapping the base 14 to form the shell 16, which is substantially perpendicular to the base 14. The opposing ends of the corresponding arms of the walls 30 and 32 mate, but need not actually touch each other.

The shell 16 is preferably oval in cross section in a plane parallel to the base 14, with the longer cross dimension of the oval in the direction of the width (shorter cross dimension) of the base 14. The end of the shell 16 adjacent to the base is defined in part by edges of the arms 44-50, which may be slightly spaced from the base as shown at 52 in FIGS. 2, 3, and 4. In the illustrative form of the invention the end of the shell 16 adjacent to the base is substantially flat. However, the opposite end of the shell 16, away from the base 14, is preferably contoured as shown, with each wall 30 or 32 having its greatest cross dimension away from the base 14 at the central stem 40 or 42 of the wall. The peaks of the walls 30 and 32, which project away from edges of the base, are provided with aligned bores 54 and 56 for receiving a pin or rivet 58 which serves as the axle of a roller 60. The roller, which may be formed of a hard plastic material, for example, may be generally ellipsoidal and may be molded with an annular "tire" 62 at the central region which engages the ground. Pin 58 is inserted through bores 54, 56 and through a central bore 64 of roller 60, one end of the pin having a head 66 too large to pass through the opening 54 and the other end of the pin being flattened as shown at 68 in FIG. 3 so as to prevent removal of the pin. Bore 64 of the roller is made just large enough to permit free rotation of the roller upon pin 58.

Figure 2:
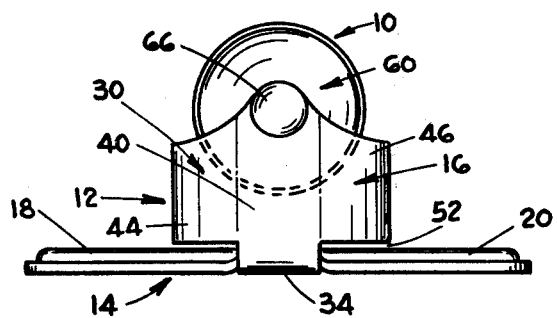
FIG. 2 is a side elevation view of the roller unit of FIG. 1 with the parts shown fully assembled.
Figure 3:
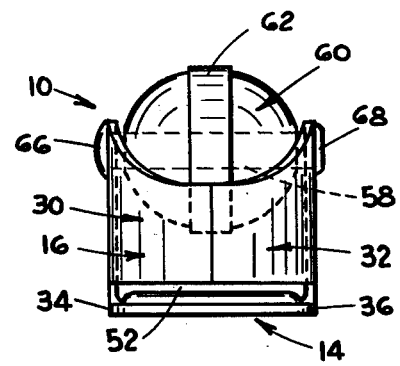
FIG. 3 is an end elevation view of the roller unit.
Figure 4:
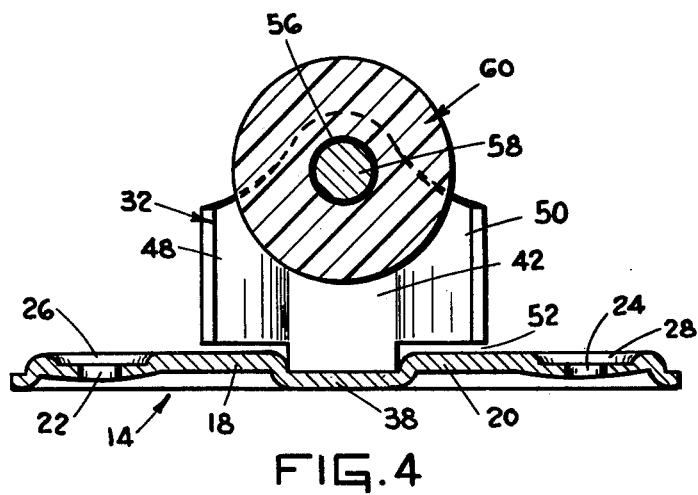
FIG. 4 is a longitudinal sectional view of the roller unit.

It is apparent from FIGS. 2–4 that when the roller 60 is mounted within the shell 16, it is sufficiently spaced from the walls of the shell and from the base 14 to provide freedom of rotation even if some debris or other foreign matter becomes lodged in the shell. The aforesaid contouring of the edge of the shell away from the base exposes a major portion of the roller surface and provides sufficient clearance with respect to the shell to permit the removal of any accumulated foreign matter. Space 52 previously referred to assists in this regard.

The one-piece housing 12 of the invention is stronger than U-shaped housings commonly employed for casters, and avoids the need for a separate cup-shaped piece previously employed to provide a roller-receiving shell. Since the housing 12 can be manufactured without employing deep-drawing operations, it does not suffer from thinned out metal and a hole in the base, which characterize deep-drawn housings. Instead, the housing has substantially the same thickness throughout the base and the shell, and the base is closed adjacent to the shell.

Figure 6:
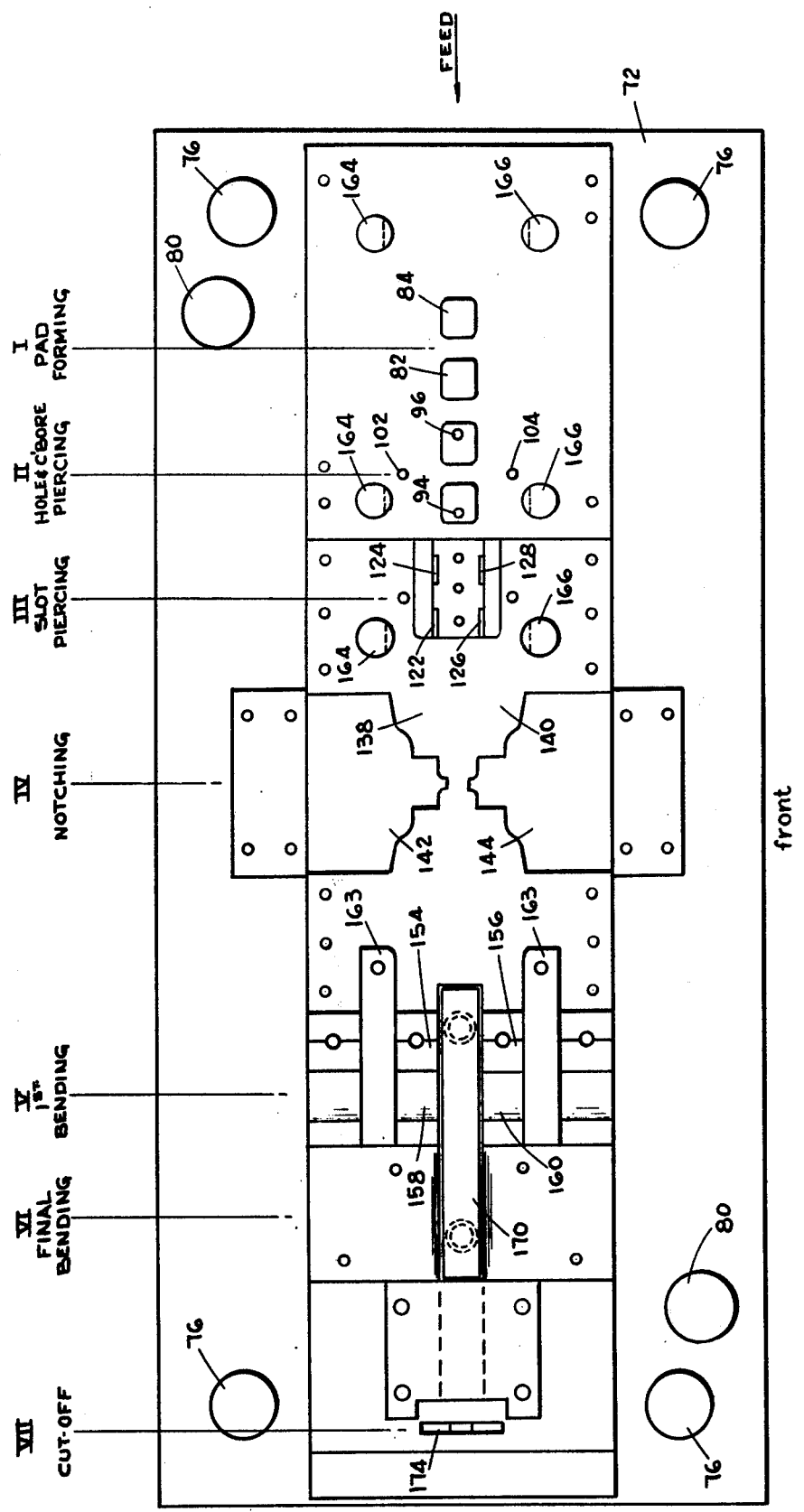
FIG. 6 is a top plan view of die apparatus which may be employed in the manufacture of the roller units of the invention.
Figure 7:
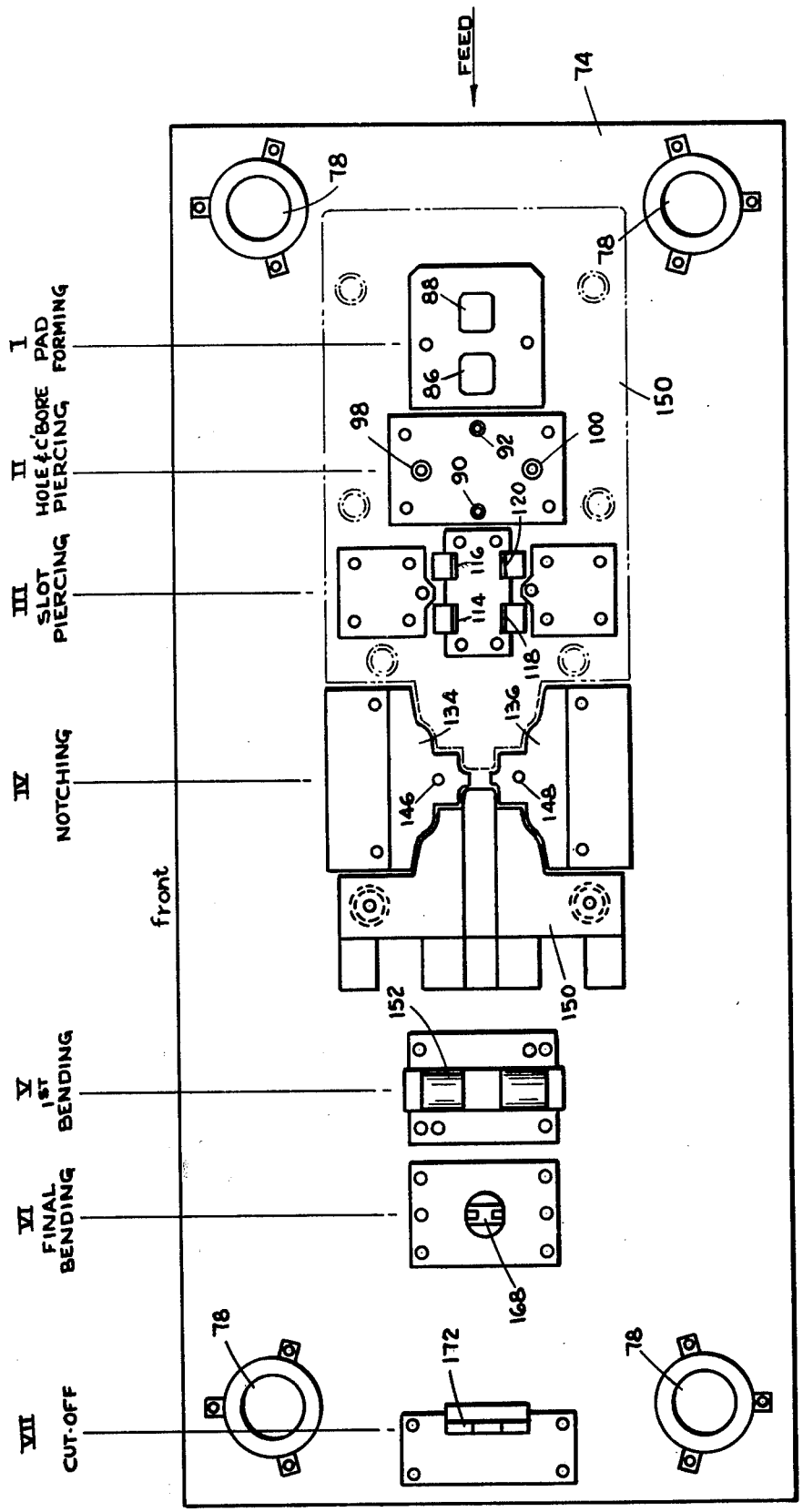
FIG. 7 is a bottom plan view of punch apparatus which cooperates with the die apparatus of FIG. 6.

FIGS. 5A and 5B illustrate a preferred method of manufacturing roller unit housings 12 of the invention. The right end of FIG. 5B is an extension of the left end of FIG. 5A, the figure being divided into two parts for purposes of illustration on a single sheet without undersirable size reduction. The housings are preferably manufactured seriatim by feeding a strip 70 of metal sheet or plate stock progressively, step-by-step, through a punch and die set, which will be referred to more fully hereinafter. The metal strip may be steel of appropriate thcikness, for example, or other metal having sufficient strength to form a roller housing and capable of being worked in the manner to be described. As the strip 70 is fed from right to left in FIGS. 5A and 5B, the following designated operations are performed at corresponding stations of the punch and die apparatus:

I. Pad forming
 II. Hole and counterbore piercing
 III. Slot piercing
 IV. Notching
 V. First bending
 VI. Final bending
 VII. Cut-off FIGS. 6 and 7 illustrate, respectively, die apparatus and punch apparatus which together constitute a punch and die set of the type preferably employed for performing the foregoing designated operations. The die in FIG. 6 is seen from above, in its normal operative position, while the punch of FIG. 7 is shown inverted for purposes of illustration, the front of the punch designated in FIG. 7 appearing at the top of the figure, and the front of the die designated in FIG. 6 appearing at the bottom of the figure. The working parts of the die and the punch are conventionally supported on holders 72 and 74, respectively. In operation the punch holder 74 moves toward and away from the die repetitively, guide posts 76 at the corners of the die holder 72 sliding in corresponding guide bushings 78 at the corners of the punch holder 74 to guide the vertical reciprocating movement of the punch, which is limited by stops 80.

Referring now to FIGS. 6 and 7 in conjunction with FIGS. 5A and 5B, at Station I of the punch and die set, the pads 18 and 20 are embossed to the necessary height and shape. Up-raised pad-forming members 82 and 84 of the die are encircled by recessed pad areas 86 and 88 of the punch holder. Tight clearance is maintained along the edges to give clean, sharp lines.

At Station II the pad areas 18 and 20 are pierced and embossed downwardly to provide a hole and counterbore recess 22, 26 or 24, 28 in each pad area. At the same time near the outer edges of the stock strip additional holes 54 and 56 are pierced. The counterbore punches 90 and 92 of FIG. 7 have shoulders that provide the embossed counterbores. The die underneath is recessed at 94 and 96 to enable the embossed metal to move downward, the central portions of the metal in the recesses being punched out, of course. The piercing of holes 54 and 56 employs straight punches 98 and 100 cooperating with holes 102 and 104 in the die.

At Station III four slots 106, 108, 110, and 112 are punched from the metal strip 70 by slot punches 114, 116, 118, and 120 cooperating with die openings 122, 124, 126, and 128. The slots serve to delineate the width dimension of the base 14 of the roller housing and at the same time to free up the metal for the bends necessary to form the shell 16 of the finished piece. The slots do not provide the full side edge of the base, however. The provision of slots at this point in the manufacturing process facilitates the punching out of larger areas at the next station. Holes 54 and 56 serve as pilot holes at the slot piercing Station III and at subsequent stations. A blunt nosed punch enters each hole prior to any piercing or forming at the stations. This provides perfect line-up of piercings, embossings, etc., based on a definite step from one station to the next.

At Station IV notching (piercing) is performed at opposite sides of the strip 70, with removal of the odd-shaped metal pieces 130 and 132. The piercing forms base and wing edges in two steps IVA and IVB. As pieces 130 and 132 are removed, leading edges of the base and wings of a housing are defined at IVA (and trailing edges of the preceding housing at IVB). When the next pieces 130 and 132 are removed, trailing edges are defined at IVB (and leading edges of the next housing at IVA). As shown, the piercings at Station IV blend in with the slot piercings at Station III, so that each slot is opened at one end thereof. The large piercing operation at Station IV is accomplished by having the necessary heavy punches 134 and 136 mounted on the punch holder and cooperating with cutting edges of inserts 138 and 140 in the die block, which are used instead of cutting edges in the die block itselt so that it is easy to renew the cutting edges without changing the die block itself. The die openings are shown at 142 and 144 in FIG. 6. Spring loaded pins 146 and 148 in the punch may be employed to assist in removing pieces 130 and 132.

The notching operation at Station IV and the slots 106–112 define the complete edge contours of the base 14 of the roller housing, except for the bridge pieces 149. Also defined are the walls 30 and 32 (including arms 44–50), which at this point in the manufacturing process are merely flat wings projecting outwardly from central side edge regions 34 and 36 of the base 14 in the same plane as the base. It will be noted that pilot holes 54 and 56 are now positioned in the wings.

Up to a position between Stations IV and V, we have held the stock firmly against the face of the die holder by means of a spring loaded stripper plate 150 which is in two sections (one of which is shown in phantom for the purpose of clarity in illustration) and is mounted on the punch holder by means of shouldered screws. Eight springs exert pressure against this stripper to create a firm hold on the stock while the operations are being performed. In FIG. 5B the shaped regions S show the final contact of the stripper plate with the stock strip before the first bending operation.

At Station V the wings 30 and 32 are made U-shaped by means of a solid punch 152 extending down from the punch holder. Its height allows for a single metal thickness between its lower surface and the surface of the die. Its shape resembles the inner contours of the formed wings. The center of the forming area at Station V is cut out to match the width of the base of the housing. Extending upward from the die is a spring loaded pad 170 with a flat facing. This pad extends slightly above the forming die at Station V. Thus when the punch comes down to form the wings, it first pushes the stock against this forming pad to clamp it. Further downward travel pushes the wings 30 and 32 against the forming die 158, 160 to give them their outside contour, while the forming punch gives them their inside shape. Bars 163 effectively confine the stock strip 70 between their inner edges. The strip was earlier confined by means of six rollers 164 and 166 mounted on the die in the area up to Station IV. This assures the formation of the wings upward at a true 90° angle. The spring loaded pad 170 extending between Stations V and VI is exactly the size of the finished width of the part.

At Station VI the wings are bent upward (at right angles to the base 14) so as to mate with one another at the center of the base. This completes the shell 16 which ultimately receives the roller 60. To perform this operation a round shaped punch 168 extends downwardly from the punch holder. It is the same height as the punch of Station V and its face is contoured to match the pad areas at the bottom of the housing shell. Both punches in Stations V and VI strike the stock simultaneously, clamping the stock between their faces and the upstanding forming pad 170 previously mentioned. The die area at Station VI is the same size as the forming pad. When the punch strikes the wings forcing them to go down further, the wings bend inward as they enter the die area, while the spring pad continues to move down. Thus both of Stations V and VI have similar pad movement.

At the end Station VII, a simple blade punch 172 cooperating with a cut-off die 174 chops out the small bridge piece 149 which ties the roller housing to the strip.

The roller housings, which may be chrome plated or otherwise conventionally surface finished, are then assembled with rollers in the manner described previously.

While preferred embodiments of the invention have been shown and described, it will be apparent to those skilled in the art that changes may be made without departing from the principles and spirit of the invention, the scope of which is defined by the following claims.

We claim:

1. A method of making a roller unit which comprises forming from a metal sheet a base and a pair of wings integral with said base and extending outwardly of said base from opposite edges thereof, and forming said wings into a shell substantially perpendicular to said base by bending said wings relative to said base at said edges and by making each wing substantially U-shaped with arms extending toward corresponding arms of the other wing and overlapping said base.

2. A method in accordance with claim 1, wherein the forming of said base comprises forming a pair of spaced pads up-raised from said sheet.

3. A method in accordance with claim 2, further comprising forming bores in said pads whereby said pads may be secured to an object.

4. A method in accordance with claim 3, wherein said bores are countersunk in a direction opposite to the up-raising of said pads.

5. A method in accordance with claim 1, wherein the forming of said base comprises punching slots from said sheet at opposite sides of each pad.

6. A method in accordance with claim 5, wherein said forming of said wings comprises punching pieces from said sheet at opposite sides of said pads and intersecting said slots so as to open one end thereof.

7. A method in accordance with claim 1, further comprising punching a hole in each wing positioned so that said holes are aligned in said shell.

8. A method of making roller units seriatim from a metal strip, which comprises performing the following operations upon an area of said strip and repeating the operations at successive areas of said strip: forming a pair of spaced pads up-raised from said strip, forming bores in said pads to receive fasteners for attaching the corresponding roller unit to an object, forming slots at opposite sides of each of said pads to provide pairs of spaced slots at said sides to define part of the perimeter of a base including said pads, removing metal from said strip at said opposite sides of said pads so as to open said slots at one end thereof to provide a pair of wings at opposite sides of said base, respectively, with each wing having a stem integral with a region of said base between said pads and having opposite arms defined in part by the slots at the corresponding side of said base, providing a shell substantially perpendicular to said base by forming each wing into a substantially U-shaped configuration and bending said wings toward each other about said region between said pads so as to mate the corresponding arms of the wings, and separating said base from said strip.

9. A method in accordance with claim 8, further comprising punching a pair of holes in said strip so as to be located in said wings, respectively, and positioned so that said holes are in alignment in said shell, for receiving the axle of a roller.

10. A method in accordance with claim 9, further comprising mounting a roller in said shell for rotation about an axle inserted in said holes.

11. A method in accordance with claim 9, wherein guide means are inserted in said holes to position said strip during subsequent operations.

12. A method in accordance with claim 8, wherein said metal removal provides an elongated base with said pads at opposite ends thereof and with said wings extending from opposite side edges thereof between said pads.

13. A method in accordance with claim 12, wherein said pads are rectangular and wherein the forming of said slots and the removal of said metal define a rectangular base.

14. A method in accordance with claim 13, wherein the removal of said metal provides wings with a cross dimension away from said base that is greater at the stems than at the arms of the wings.

15. A method in accordance with claim 8, wherein said operations are performed at successive stations of a punch and die set through which said strip is fed step-by-step.

* * * * *